United States Patent
Zhu et al.

(10) Patent No.: US 10,353,859 B2
(45) Date of Patent: Jul. 16, 2019

(54) REGISTER ALLOCATION MODES IN A GPU BASED ON TOTAL, MAXIMUM CONCURRENT, AND MINIMUM NUMBER OF REGISTERS NEEDED BY COMPLEX SHADERS

(71) Applicants: Advanced Micro Devices, Inc., Sunnyvale, CA (US); ATI Technologies ULC, Markham (CA)

(72) Inventors: YunPeng Zhu, Shanghai (CN); Jimshed Mirza, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 69 days.

(21) Appl. No.: 15/432,173

(22) Filed: Feb. 14, 2017

(65) Prior Publication Data

US 2018/0210732 A1 Jul. 26, 2018

(30) Foreign Application Priority Data

Jan. 26, 2017 (CN) .......................... 2017 1 0061694

(51) Int. Cl.
- *G06F 9/38* (2018.01)
- *G06F 15/78* (2006.01)
- *G06F 9/50* (2006.01)
- *G06F 9/46* (2006.01)

(52) U.S. Cl.
CPC ............ *G06F 15/78* (2013.01); *G06F 9/3851* (2013.01); *G06F 9/46* (2013.01); *G06F 9/50* (2013.01)

(58) Field of Classification Search
CPC ..................................................... G06F 9/3851
See application file for complete search history.

(56) References Cited

U.S. PATENT DOCUMENTS

| | | | |
|---|---|---|---|
| 9,692,908 B1* | 6/2017 | Wu ........................ | H04M 7/129 |
| 9,972,063 B2* | 5/2018 | Ashari ...................... | G06T 1/20 |
| 2004/0237074 A1* | 11/2004 | Aronson ............... | G06F 8/4434 |
| | | | 717/158 |
| 2011/0161616 A1* | 6/2011 | Tarjan ..................... | G06F 9/384 |
| | | | 711/170 |
| 2013/0024647 A1* | 1/2013 | Gove .................... | G06F 12/084 |
| | | | 711/207 |
| 2016/0349832 A1* | 12/2016 | Jiao ........................ | G06F 1/3296 |
| 2017/0139707 A1* | 5/2017 | Jang ....................... | G06F 9/3012 |
| 2017/0371653 A1* | 12/2017 | Gottlieb ................ | G06F 9/3005 |
| 2017/0371654 A1* | 12/2017 | Bajic ..................... | G06F 9/3012 |

OTHER PUBLICATIONS

Rogers, Timothy G. "Cache-Conscious Wavefront Scheduling", Proceedings of the 2012 45th Annual IEEE/ACM International Symposium on Microarchitecture, Dec. 1-5, 2012, Vancouver, B.C., Canada, 12 pages.

* cited by examiner

*Primary Examiner* — Jacob Petranek

(57) ABSTRACT

A method for allocating registers in a compute unit of a vector processor includes determining a maximum number of registers that are to be used concurrently by a plurality of threads of a kernel at the compute unit. The method further includes setting a mode of register allocation at the compute unit based on a comparison of the determined maximum number of registers and a total number of physical registers implemented at the compute unit.

16 Claims, 5 Drawing Sheets

REGISTER ALLOCATION MODES IN A GPU BASED ON TOTAL, MAXIMUM CONCURRENT, AND MINIMUM NUMBER OF REGISTERS NEEDED BY COMPLEX SHADERS

BACKGROUND

Graphics processing units (GPUs) and other vector processors typically employ a plurality of compute units, each having one or more arithmetic logic units (ALUs), to execute corresponding plurality of threads of a shader or other compute kernel in parallel. Each compute unit provides a set of physical general purpose registers (GPRs) that can be allocated to threads for use during execution of the thread at the compute unit. However, each physical GPR implemented in a compute unit consumes a corresponding amount of power. More complex shaders or kernels often require a large number of GPRs, and thus ensuring that a sufficient number of physical GPRs is available to support such complex compute kernels can result in excessive power consumption, as well as require considerable die floorspace to implement. Conversely, if a lower number of GPRs is used in view of power and floorspace limitations, the processor typically is correspondingly limited in the number of threads that can be executed in parallel, which can lead to relatively low ALU occupancy.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
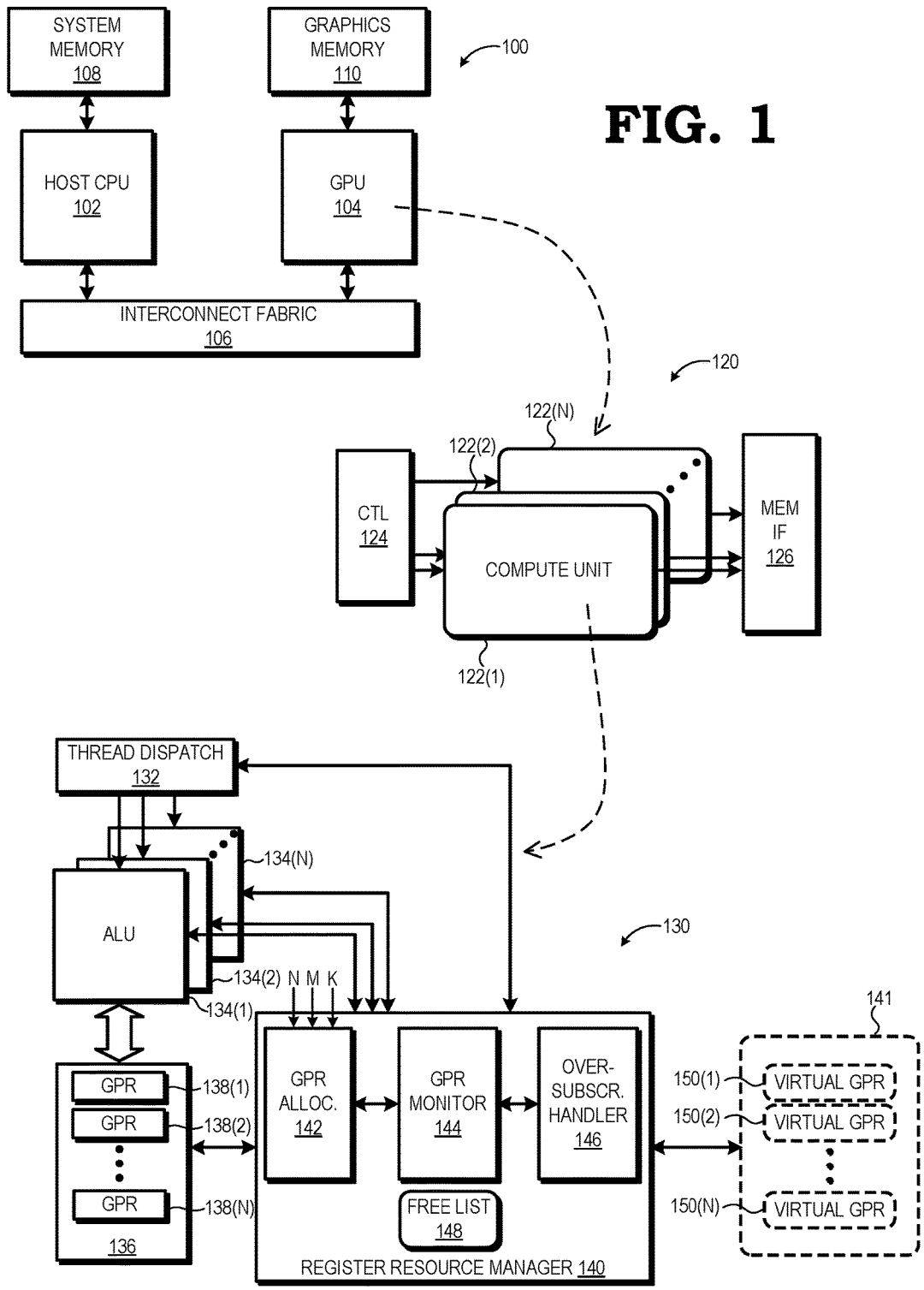
FIG. 1 is a block diagram of a vector processor utilizing GPR resource management with oversubscription support in accordance with some embodiments.

Conventional GPUs and other vector processors typically implement a relatively large number of physical GPRs in order to support complex compute kernels, which can negatively impact their power and thermal characteristics. FIGS. 1-5 illustrate example techniques for GPR resource management in a vector processor by providing various GPR allocation modes and by providing an oversubscribed GPR facility, which together provide comparable compute ability with fewer physical GPRs, or improved compute ability for the same number of physical GPRs, compared to conventional GPR allocation schemes.

In at least one embodiment, the vector processor utilizes a GPR resource manager in each compute unit. For a compute kernel having a wavefront of threads to be executed at the ALUs of the compute unit, the GPR resource manager determines various GPR-usage parameters of the wavefront of threads, including one or more a combination of: the maximum number of GPRs to be used concurrently by the threads of the wavefront, the total number of GPRs to be used during execution of the threads of the wavefront, the minimum number of GPRs required to initiate execution of all of the threads of the wavefront. In some embodiments, some or all of these parameters are determined during compilation of the compute kernel, and the compiler encodes or otherwise associates values representing these values with the code of the compute kernel. In other embodiments, the vector processor or an associated processor (e.g., a central processing unit (CPU)) may perform a real-time analysis to determine these parameters.

The GPR resource manager determines the relationship between some or all of these GPR-usage parameters (as well as their relationship with the number of physical GPRs implemented at the compute unit). Based on these relationships, the GPR resource manager implements one of a plurality of GPR allocation modes. To illustrate, in response to determining that the total number of GPRs to be used by the threads is greater than the number of physical GPRs at the compute unit and determining that the number of physical GPRs at the compute unit is greater than the maximum number of GPRs to be used, the GPR resource manager initiates a recapture allocation mode whereby each physical GPR allocated for use in execution of an instruction is marked as the last usage for that physical GPR, and thus when execution of the instruction is completed, the physical GPR is deallocated and becomes available for reallocation. In response to determining the maximum number of GPRs to be used concurrently by the threads of the wavefront is greater than the number of physical GPRs at the compute unit and determining that the number of physical GPRs is greater than the total number of GPRs required to initiate execution of the threads of the wavefront, the GPR resource manager initiates a thread initialization allocation mode whereby each thread is allocated a number of physical GPRs sufficient to initiate execution of the thread, and then physical GPRs are dynamically allocated to threads thereafter as they are requested by the threads.

Depending on the number of physical GPRs at the compute unit and the complexity of the compute kernel being executed thereon, the compute unit may reach an oversubscription condition whereby the GPR resource manager runs out of physical GPRs to allocate to the threads. In response to such an oversubscription condition, the GPR resource manager enters an oversubscribed state so as to handle the oversubscription of physical GPRs. In some embodiments, the GPR resource manager operates in a thread suspend mode while in this oversubscribed state, in which a thread requesting allocation of a GPR while the physical GPRs are oversubscribed is suspended until a physical GPR is deallocated from another thread and thus available for allocation to the suspended thread. In other embodiments, the GPR resource manager operates in a virtual GPR mode in which subsequent requests for GPR allocation are handled by instantiating a virtual GPR in a local cache or off-chip memory and allocating this virtual GPR to the requesting thread.

Through selection of an appropriate GPR allocation mode based on comparisons of the GPR-usage parameters, and through employment of an oversubscription facility when the physical GPRs become oversubscribed in whichever allocation mode is selected, the GPR resource manager can effectively support the GPR needs of the compute kernel with a smaller number of physical GPRs compared to conventional GPR approaches, while providing comparable compute performance, and thus enabling lower power consumption for equivalent compute performance.

FIG. 1 illustrates a compute system 100 employing oversubscribed GPR resource management in accordance with some embodiments. In the depicted example, the compute system 100 includes a host central processing unit (CPU) 102, a GPU 104 (or other vector processor), an interconnect fabric 106, one or more system memories 108, and one or more graphics memories 110. The host CPU 102 operates to execute one or more software applications represented by software stored in the system memory 108. During the course of execution of a software application, the host CPU 102 generates compute tasks for execution by the GPU 104 in the form of a shader or other compute kernel performed using data stored in the graphics memory 110. Communication between the host CPU 102 and GPU 104 occurs via the interconnect fabric 106, which can include one or more communication interconnects and controllers for various input/output (I/O) devices (omitted from FIG. 1), such as a Northbridge, a Southbridge, or combination thereof.

As illustrated by detailed view 120, the GPU 104 includes a plurality of compute units 122 (also known as stream processors, cores, or single-instruction-multiple-data (SIMD) engines), including the illustrated compute units 122(1), 122(2), and 122(N). The plurality of compute units 122 are managed together via a control unit 124, and each compute unit 122 has access to a memory hierarchy of the GPU 104, which may include local shared or private caches (not shown), as well as the one or more graphics memories 110 accessed via a memory interface 126. The control unit 124 includes a command processor that operates to dispatch work tasks to the compute units 122 in the form of a compute kernel. Depending on implementation and the particular work tasks assigned to the GPU 104, each compute unit 122 may receive the same compute kernel to execute in parallel with the other compute units 122, or different compute kernels may be distributed to different compute units 122 for parallel execution.

As illustrated by detailed view 130, each compute unit 122 includes a thread dispatch controller 132 and a plurality of arithmetic logic units (ALUs) 134, such as the depicted ALUs 134(1), 134(2), and 134(N), supported by a register file 136 comprising a plurality of physical GPRs 138, such as the depicted GPRs 138(1), 138(2), and 138(N). The compute unit 122 also includes a GPR resource manager 140 coupled to the thread dispatch controller 132, the ALUs 134, the register file 136, and a memory hierarchy 141 of the GPU 104, which, as noted above, may include local level 1 (L1) caches, level 2 (L2) caches, and the like, as well as off-chip memory (e.g., graphics memory 110). The GPR resource manager 140 includes a GPR allocator 142, a GPR monitor 144, and an oversubscribed handler 146, each of which is implemented as hardcoded logic, programmable logic, or a combination thereof.

The GPR resource manager 140 further includes a free list 148 used to store status information pertaining to the physical GPRs 138 of the register file 136, and which is implemented as, for example, a content-addressable memory (CAM) structure or other data storage structure. In at least one embodiment, each entry of the free list 148 includes a GPR identifier (ID) field to store an ID of a corresponding physical GPR 138, an allocation status field to store a value indicating whether the physical GPR 138 is current allocated (e.g., a bit value with a "0" indicating unallocated and a "1" indicating allocated), an allocation ID field identifying the thread or ALU to which the physical GPR 138 has been allocated to, if allocated, and the like. Further, in some embodiments, the free list 148 is implemented as part of the register file 136, and thus each entry of the free list 148 can include a field to store a value for the corresponding physical GPR 138—that is, this field serves as the physical GPR 138 itself.

As a general operational overview, a shader or other compute kernel dispatched to the compute unit 122 illustrated by detailed view 130 is received at the thread dispatch controller 132, which in turn dispatches a corresponding thread to each of the ALUs 134, with the totality of threads dispatched concurrently referred to as a wavefront of L threads, with L representing the number of threads in the wavefront. Each thread is composed of a set of instructions to be executed at the ALU 134, with some or all of the instructions utilizing operands that are stored in a GPR while the instruction is being executed by the ALU 134. Accordingly, for each operand not yet allocated a GPR, the ALU sends an allocation request to the GPR resource manager 140 to request allocation of a GPR for use by the instruction for one of its operands.

Ideally, the register file 136 would have a sufficient number of physical GPRs 138 so that every allocation request can be fulfilled by allocation of a physical GPR 138 without delay. However, the number of physical GPRs 138 to achieve this goal may be impracticable from a power, temperature, and floorspace standpoint, particularly for complex compute kernels. Accordingly, the GPR resource manager 140 operates to efficiently utilize a relatively small number of physical GPRs 138 so as to improve compute throughput of the compute unit 122. To this end, the GPR resource manager 140 selectively implements different allocation modes based on the particular relationships between GPR-usage metrics for the compute kernel, and further to operate in an oversubscribed state responsive to an oversubscription condition, that is, when all physical GPRs 138 are allocated. During the oversubscribed state, threads may be either temporarily suspended until physical GPRs become available, or the GPR resource manager 140 may utilize instantiated virtual GPRs 150, such as the illustrated virtual GPRs 150(1), 150(2), and 150(N), in a local cache, off-chip memory, or other memory location within a memory hierarchy 141 of the GPU 104.

Figure 2:
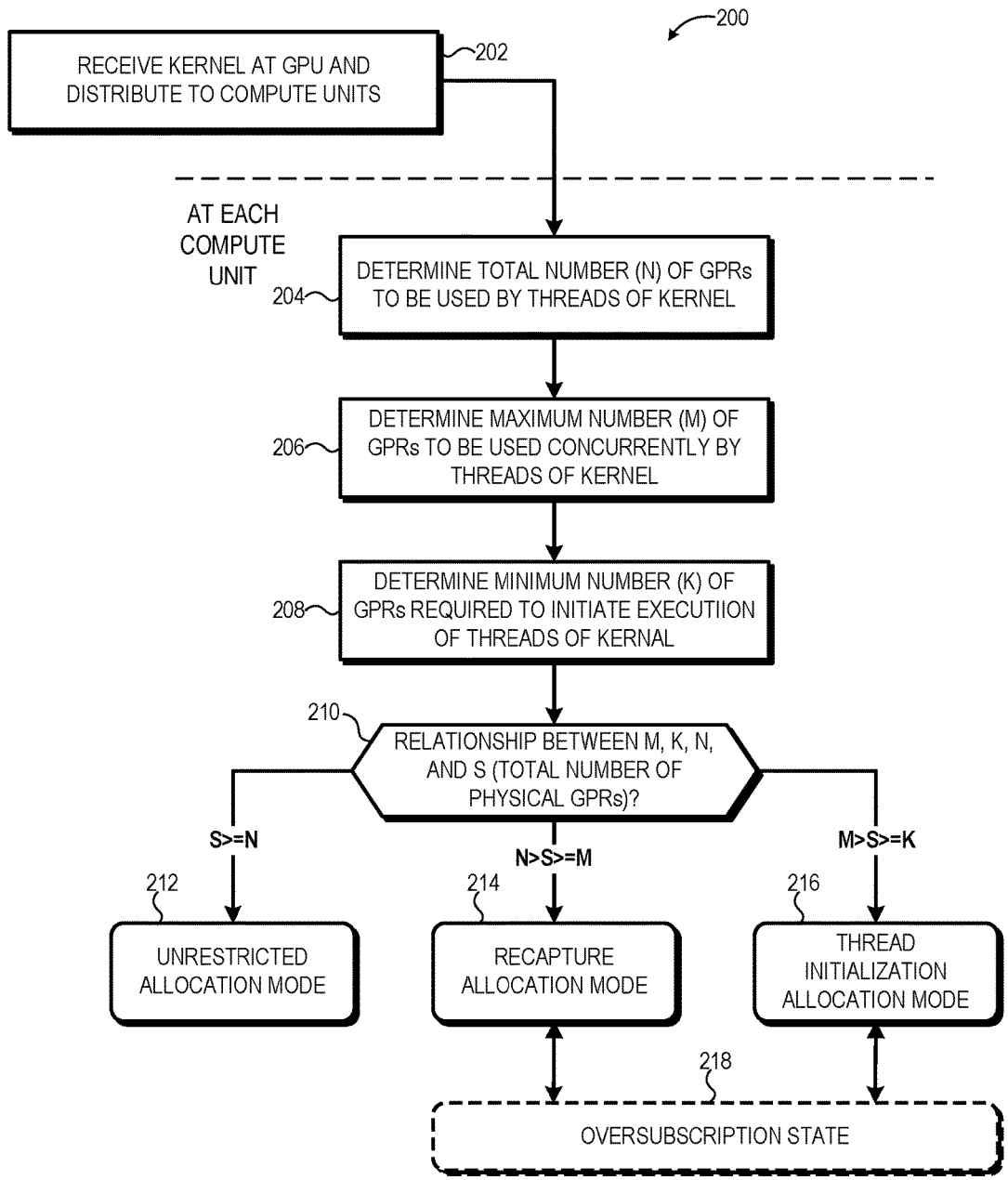
FIG. 2 is a flow diagram illustrating a method of operation of a GPR resource manager of the vector processor of FIG. 1 for setting a mode of GPR allocation in accordance with some embodiments.

FIG. 2 illustrates an example method 200 for this selective allocation mode implementation by the GPR resource manager 140 in accordance with at least one embodiment. The method 200 initiates at block 202 with receipt of an instance of a compute kernel at a compute unit 122 and identification of a wavefront of L threads to be executed in parallel for the compute kernel by L corresponding ALUs 134 of the compute unit 122. Before initiating execution of the wavefront of threads, the GPR allocator 142 determines various GPR-usage metrics for the threads of the wavefront. In particular, at block 204, the GPR allocator 142 determines the total number of GPRs that will be used or requested by the threads of the wavefront during its entire allocation, this number being identified herein as value "N". At block 206, the GPR allocator 142 determines the maximum number of GPRs that are to be used by the threads of the wavefront concurrently, that is the maximum number of GPRs that are to be employed simultaneously by the threads at the compute unit 122. This maximum number is identified herein as value "M". At block 208, the GPR allocator 142 determines the minimum number of GPRs required to allow each and every thread of the wavefront (that is, all L threads) to initiate execution. This number is identified herein as value "K". Note that these GPU-usage metrics may be determined in another order, or may be determined concurrently. Further, the GPR allocator 142 is informed of the number of physical GPRs 138 implemented at the compute unit 122, with this number being identified herein as value "S".

The GPR allocator 142 determines the GPR-usage metrics for the wavefront of threads using any of a variety of techniques. In some embodiments, one or more of the GPR-usage metrics is determined at compilation-time by a compiler of the compute kernel during the compilation process, and the compiler then embeds or otherwise associates values representative of these GPR-usage metrics with the code representing the compute kernel. As one example, each of the values M, K, and N is encoded as part of configuration data or other metadata in a header of the data structure representing the compute kernel. In such an implementation, the process of determining these GPR-usage metrics as represented by blocks 204 206, and 208 includes, for example, accessing these values from the compute kernel data, or receiving these values as side-band data from the CPU 102 or other source, and then storing these values at the compute unit 122 for access by the GPR allocator 142. In other embodiments, the CPU 102 or GPU 104 implements a real-time compiler or other analytic process that analyzes the received compute kernel to determine these GPR-usage metrics, and thus determining the GPR-usage metrics as represented by blocks 204, 206, and 208 includes performing this analytic process, or receiving these values as a result of the performance of this analytic process.

To illustrate, a compiler may segment the instructions of a kernel into a plurality of each segments. For each segment, the compiler analyzes the instructions contained therein and determines the number of GPRs required to support that particular segment. This number of GPRs then may be inserted into the segment, or otherwise associated with the segment as, for example, segment metadata. Thus, when the compute unit fetches an instruction for execution by a thread, the compute unit identifies the segment associated with the instruction, and thus identify the number of GPRs required for that segment. To illustrate, assume segment 1 is determined to require 10 GPRs, and there are 1000 threads to execute. If all threads are executing segment 1 concurrently, the number of GPRs required is 10,000 GPRs (10 GPRs/segment*1,000 segments concurrently executing).

At block 210, the GPR allocator 142 determines the relationships between the GPR-usage metrics and the number of physical GPRs 138 by comparing these values with each other. From the determined relationships, the GPR allocator 142 sets a particular mode of register allocation at the compute unit 122 for execution of the wavefront of threads. If the number of physical GPRs 138 is greater than or equal to the total number of GPRs to be used by the wavefront (that is, S>=N), then there is no need to constrain physical GPR allocation or prepare for an oversubscribed condition. Accordingly, if such a relationship is detected, the GPR allocator 142 sets the compute unit 122 to an unrestricted allocation mode (represented by block 212) in which the wavefront can executed without any restriction on the allocation of physical GPRs 138 as needed by the threads.

However, in the more typical scenario where the number of physical GPRs 138 at the compute unit 122 is less than the total number of GPRs to be used by the wavefront (that is, N>S), then the GPR allocator 142 considers the relationship between the number of physical GPRs, the maximum number of GPRs concurrently used by the threads of the wavefront, and the number of GPRs needed to initiate execution of the threads of the wavefront. In response to determining that the number of physical GPRs 138 is greater than or equal to the maximum number of GPRs used concurrently (that is, N>S>=M), then the GPR allocator 142 sets the compute unit 122 to a recapture allocation mode (represented by block 214) in which the wavefront of threads begins execution, and requests for GPR allocation by the threads during execution are handled by dynamically-allocating available physical GPRs 138 to the threads while marking them as "last use" so that when execution of the instruction referencing the allocated physical GPR 138 completes, the physical GPR 138 is dynamically deallocated from the thread and thus made available for reallocation for another thread, or for use by another instruction of the same thread. An example of the recapture allocation mode is described in greater detail below with reference to FIG. 3.

Conversely, in response to determining that the number of physical GPRs 138 is less than the maximum number of GPRs used concurrently but greater than or equal to the number of GPRs required to initiate execution of all of the threads of the wavefront (that is, M>S>=K), then the GPR allocator 142 sets the compute unit 122 to a thread initialization allocation mode (represented by block 216) in which each thread of the wavefront is allocated a number of physical GPRs 138 required to initiate execution of the thread (that is, K/L physical GPRs 138) and then execution of the threads of the wavefront initiates or otherwise commences with the initial set of allocated physical GPRs 138. Additional physical GPRs 138 then may be dynamically on an as-needed basis as execution of the threads progresses. An example of the thread initialization allocation mode is described in greater detail below with reference to FIG. 4.

In either of the recapture allocation mode or the thread initialization allocation mode, there is the potential for the wavefront to require more GPRs than there are physical GPRs 138 in the register file 136. Accordingly, the GPR monitor 144 monitors the allocation and deallocation of physical GPRs 138 by the GPR allocator 142 during wavefront execution by monitoring updates to the free list 148 made by the GPR allocator 142 as physical GPRs 138 are allocated and deallocated. In response to determining that all of the physical GPRs 138 are allocated and thus no physical GPRs remain available for allocation (that is, an oversubscription condition), the GPR monitor 144 triggers the GPR resource manager 140 to enter into an oversubscribed state (represented by block 218). While in the oversubscribed state, the oversubscribed handler 146 controls the GPR resources in accordance with one of at least two oversubscribed modes, including a virtual GPR mode in which requests for GPR allocation are handled by the oversubscribed handler 146 instantiating a virtual GPR 150 in the memory hierarchy 141 and allocating the virtual GPR 150 to the requesting thread, and then handling the access to this virtual GPR 150 by the thread, or a thread suspend mode in which the oversubscribed handler 146 signals the thread dispatch controller 132 to suspend a thread requesting GPR allocation until a physical GPR 138 becomes available for allocation to the requesting thread. These modes of the oversubscribed state are described in greater detail below with reference to FIG. 5.

Figure 3:
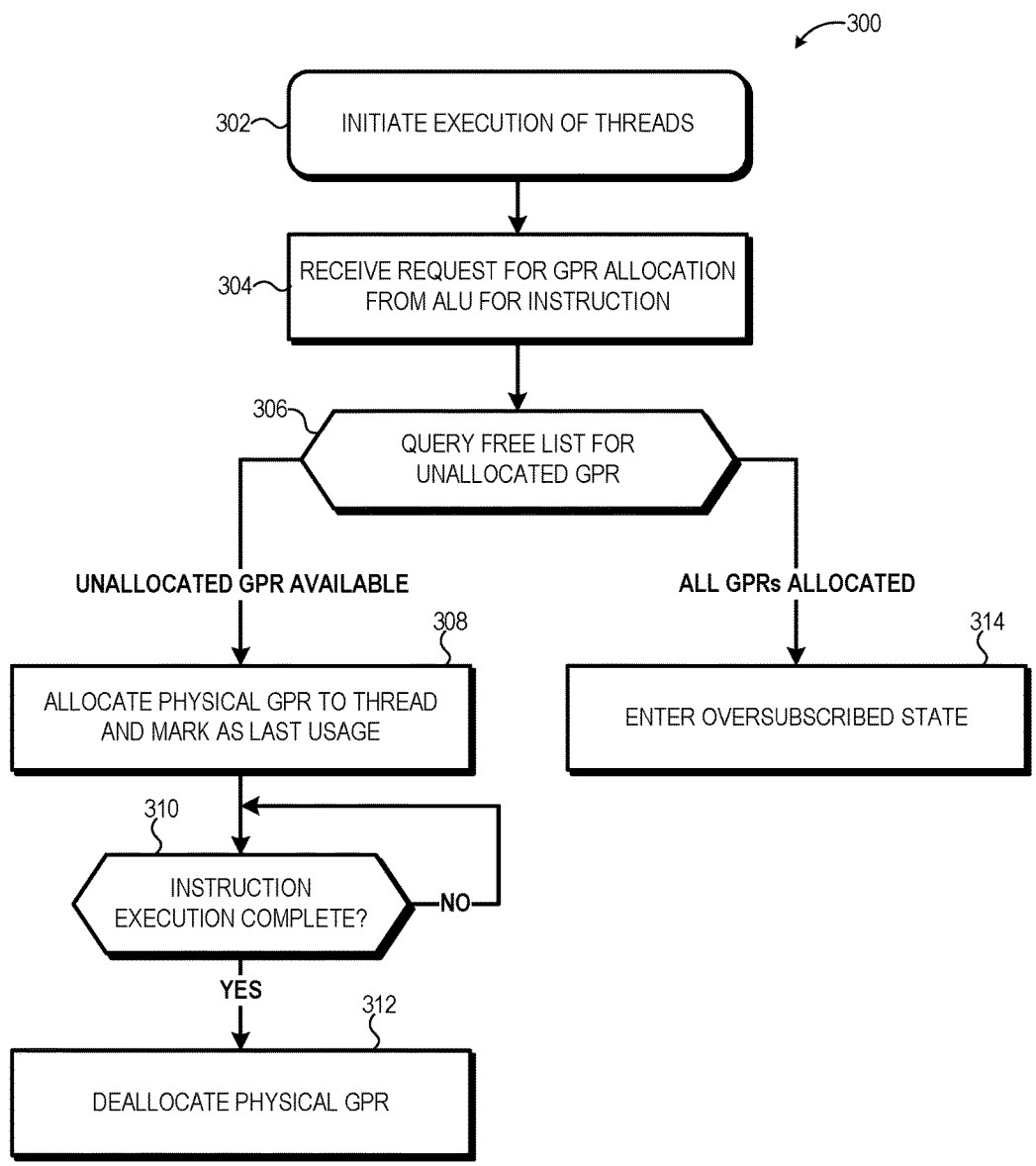
FIG. 3 is a flow diagram illustrating a method of GPR allocation in accordance with a recapture allocation mode in accordance with some embodiments.

Turning now to FIG. 3, a method 300 representing operation of the compute unit 122 while in the recapture allocation mode is illustrated in accordance with some embodiments. As noted above, in this allocation mode, the number of physical GPRs 138 is fewer than the total number of GPRs required to execute the wavefront of L threads at the compute unit 122, but greater than or equal to the maximum number of GPRs used concurrently by the wavefront. Accordingly, when entering the recapture allocation mode, the compute unit 122 initiates execution of the threads of the wavefront at block 302 without requiring any pre-allocation or apportionment of physical GPRs 138 among the threads. While the threads are being executed, at block 304 the GPR allocator 142 receives a request for allocation of a GPR for an instruction of a thread from the ALU 134 executing the thread. In response to this request, at block 306 the GPR allocator 142 queries the free list 148 to identify whether an unallocated physical GPR 138 remains in the register file 136, and if there are multiple unallocated physical GPRs 138, to select one of the multiple unallocated physical GPRs 138.

If there is at least one unallocated physical GPR 138, at block 308 the GPR allocator 142 dynamically allocates a selected unallocated physical GPR 138 to the requesting thread, and as part of this allocation process, marks the allocated physical GPR 138 as "last usage" so that the ALU 134 treats the allocated physical GPR as a last-usage GPR. Accordingly, at block 310 the ALU 134 monitors the status of the execution of the instruction to which the physical GPR 138 is dynamically allocated. In response to determining that the instruction has completed execution, at block 312 the ALU 134 signals this to the GPR allocator 142, which in response dynamically deallocates the physical register 138. This physical register 138 thus is returned to the free list 148 as a physical GPR 138 ready for allocation to another thread, or to another instruction of the previous thread. Returning to block 306, if the query of the free list 148 reveals that all physical GPRs 138 are currently allocated, the GPR monitor 144 determines that the physical GPRs 138 have become oversubscribed, and thus at block 314 the GPR monitor 144 signals the oversubscribed handler 146 to enter the oversubscribed state, which is described in more detail subsequently.

Figure 4:
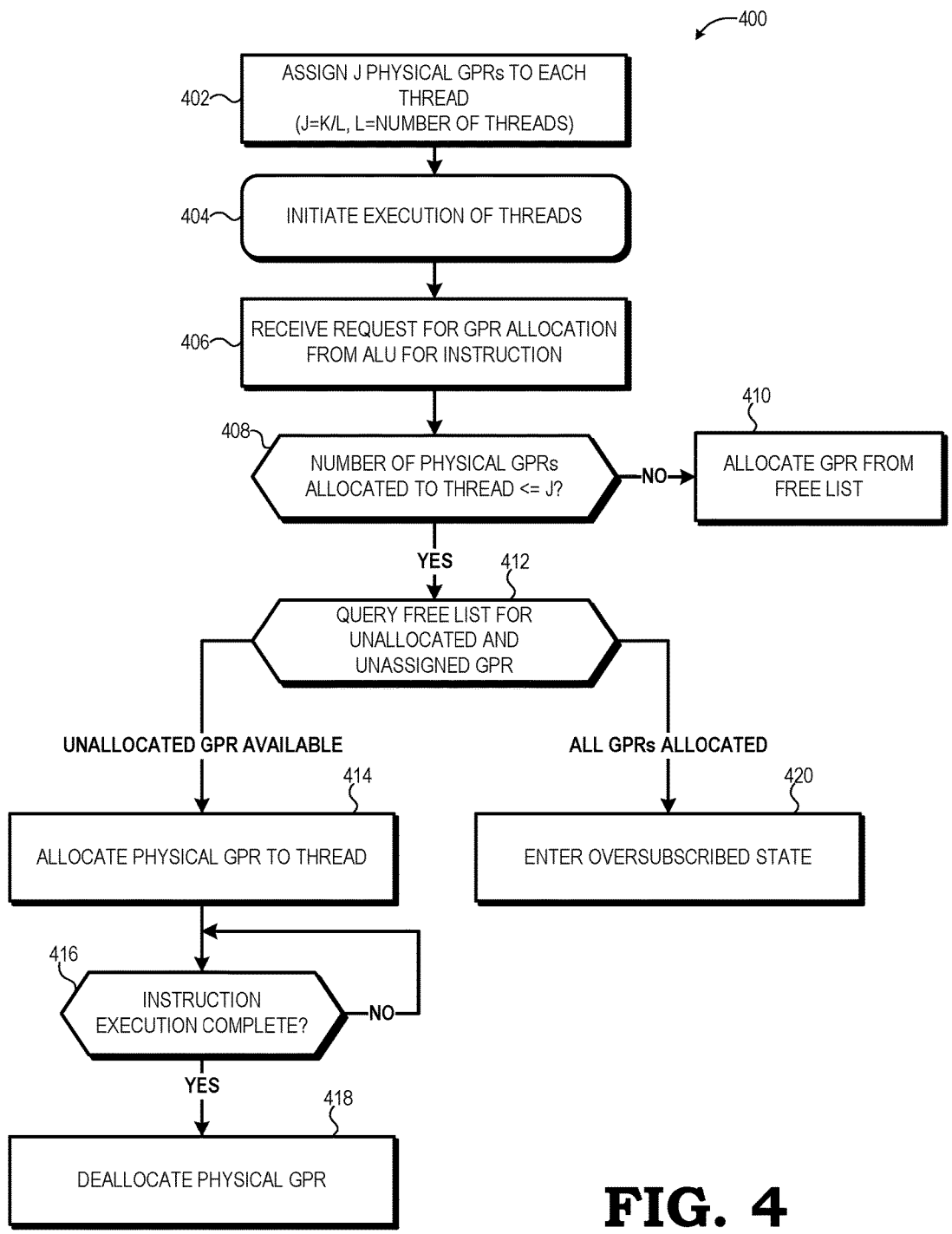
FIG. 4 is a flow diagram illustrating a method of GPR allocation in accordance with a thread initialization allocation mode in accordance with some embodiments.

Turning now to FIG. 4, a method 400 representing operation of the compute unit 122 while in the thread initialization allocation mode is illustrated in accordance with some embodiments. As noted above, in this allocation mode, the number of physical GPRs 138 is fewer than the maximum number of GPRs used concurrently by the wavefront of L threads at the compute unit 122, but greater than or equal to the number of GPRs required to initiate execution of all L threads of the wavefront. Accordingly, in the thread initialization allocation mode, the compute unit 122 seeks to maximize thread execution by providing a number of physical GPRs to each thread sufficient to allow the thread to begin execution. Accordingly, prior to beginning execution of the threads, at block 402 the GPR allocator 142 assigns J physical GPRs 138 to each thread of the wavefront of L threads, where J=K/L. The GPR allocator 142 assigns the J physical GPRs 138 by setting aside an identified set of J physical GPRs 138 for subsequent allocation to the corresponding thread, by implementing a counter that is decremented for each physical GPR 138 allocated to the thread when execution is initialized, or by directly allocating each of the J physical registers to operands of instructions at the start of the thread. With the K physical GPRs 138 assigned among the L threads, at block 404 the compute unit 122 initiates execution of the threads of the wavefront.

At block 406 the GPR allocator 142 receives a request for allocation of a GPR for an instruction of the thread from the ALU 134 executing the thread. In response to this request, at block 408 the GPR allocator 142 determines whether the requesting thread has already received its allotted J physical GPRs 138. If not, at block 410 the GPR allocator 142 allocates a physical GPR 138 from one of the remaining physical GPRs 138 of the initial allotment of J physical GPRs 138. However, if all J physical GPRs 138 have already been allocated to the requesting thread, at block 412 the GPR allocator 142 queries the free list 148 to identify whether an unallocated physical GPR 138 remains in the register file 136 and which is not already assigned to one of the other threads as that threads initial J physical GPRs 138.

If there is at least one unallocated and unassigned physical GPR 138, at block 414 the GPR allocator 142 dynamically allocates a selected unallocated and unassigned physical GPR 138 to the requesting thread, and as part of this allocation process, marks the allocated physical GPR 138 as "last usage" so that the ALU 134 treats the allocated physical GPR as a last-usage GPR. Accordingly, at block 416 the ALU 134 monitors the status of the execution of the instruction to which the physical GPR 138 is dynamically allocated. In response to determining that the instruction has completed execution, at block 418 the ALU 134 signals this to the GPR allocator 142, which in response dynamically deallocates the physical register 138. This physical register 138 thus is returned to the free list 148 as a physical GPR 138 ready for allocation to another thread, or to another instruction of the previous thread. Returning to block 412, if the query of the free list 148 reveals that all unassigned physical GPRs 138 are currently allocated, the GPR monitor 144 determines that the physical GPRs 138 have become oversubscribed, and thus at block 420 the GPR monitor 144 signals the oversubscribed handler 146 to enter the oversubscribed state.

Figure 5:
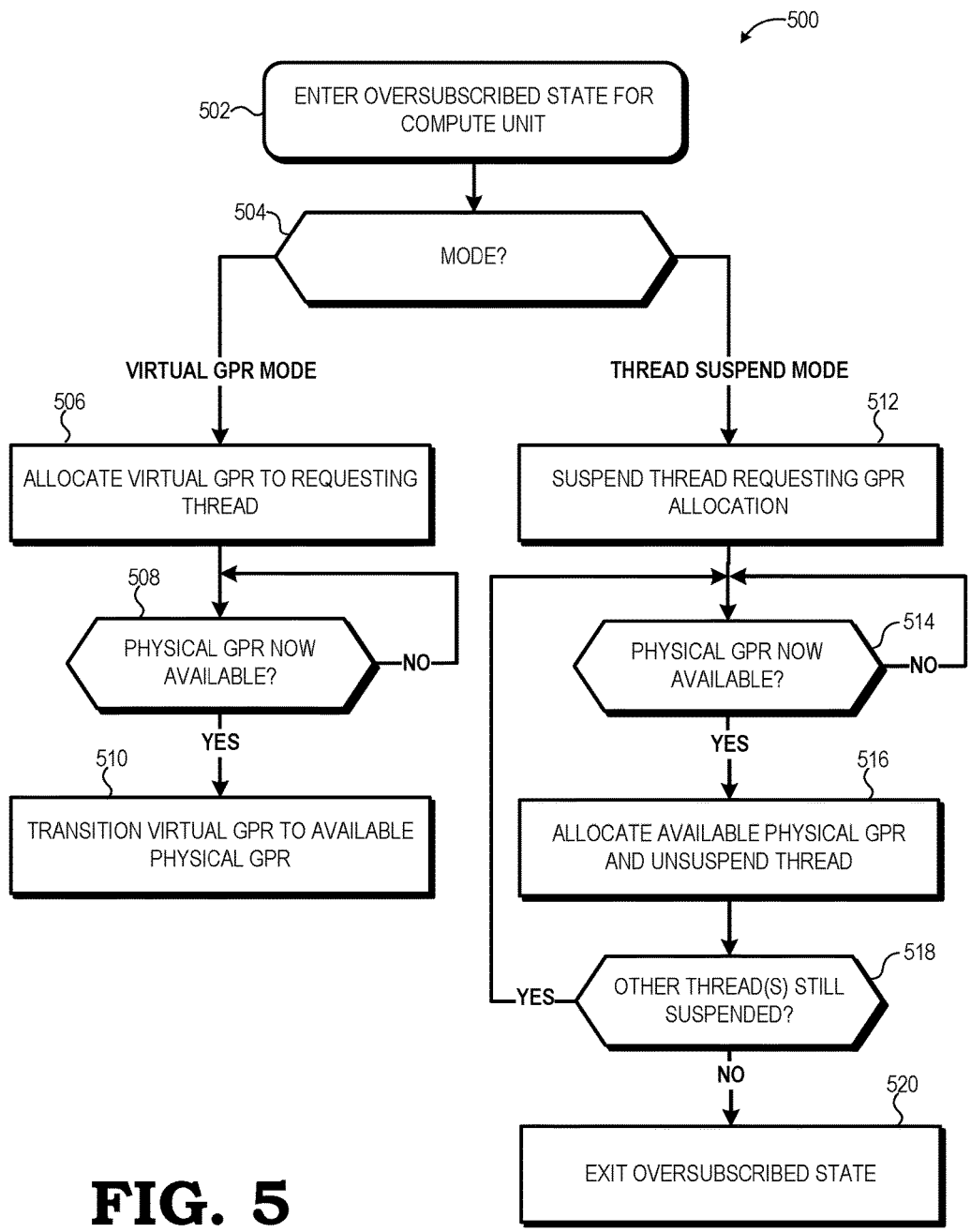
FIG. 5 is a flow diagram illustrating a method of operation of the GPR resource manager of FIG. 2 while in a GPR oversubscription state in accordance with some embodiments.

FIG. 5 illustrates an example method 500 of operation of the compute unit 122 while in the oversubscribed state in accordance with some embodiments. As similarly explained above, at block 502 the GPR monitor 144 signals the GPR resource manager 140 to enter the oversubscribed state when a request for GPR allocation is received while all physical GPRs 138 are already currently allocated (see block 314, FIG. 3 and block 420, FIG. 4). In response to entering the oversubscribed state, at block 504 the oversubscribed handler 146 determines which oversubscription mode to implement. In some embodiments, the oversubscribed handler 146 may be configurable to operate in either mode, and the particular mode may be set via a programmable register or via hardcoded configuration (e.g., via selectively blowing a configuration fuse). In other embodiments, the oversubscribed handler 146 is configured to operate in only one of these modes.

In the event that the virtual GPR mode is selected or pre-configured, the oversubscribed handler 146 enters the virtual GPR mode. In this mode, the oversubscribed handler 146 handles an allocation request for a GPR by instantiating a virtual GPR 150 in a local L1 cache or L2 cache, in the graphics memory 110, or elsewhere in the memory hierarchy 141, and allocating this instantiated virtual GPR 150 to the requesting thread at block 506. In this case, the virtual GPR 150 is implemented as a storage element having a memory address used to reference the memory location either in the local cache or in an off-chip memory, and the oversubscribed handler 146 operates as an interface such that when an ALU 134 attempts to access a virtual GPR 150 for a read or write access, the oversubscribed handler 146 operates to identify the memory address associated with the virtual GPR 150 based on a GPR ID associated with the virtual GPR 150, access the memory location referenced by this memory address, and then either access the value stored therein and return it to the ALU 134 as though it came from a physical GPR, or to write a value provided by the ALU 134 to the memory location, again as though it were a physical GPR. In this way, the oversubscribed handler 146 obfuscates the origin of the virtual GPR 150 and thus makes it appear to the ALU 134 as though it were a physical GPR 138.

While virtual GPRs allow the compute unit 122 to appear to implement a greater number of physical GPRs 138 than are actually implemented in the compute unit 122, the access to a virtual GPR 150 takes considerably longer than access to a physical GPR 138 due to memory access latencies. Accordingly, in at least one embodiment at block 508 the GPR monitor 144 monitors the free list 148 to determine whether a physical GPR 138 has been deallocated in the meantime. If so, at block 510 the GPR monitor 144 signals the oversubscribed handler 146 and the oversubscribed handler 146 transitions the virtual GPR 150 back to the unallocated physical GPR 138 by transferring the value stored in the virtual GPR 150 to the physical GPR 138 and updating its reference table to point the GPR ID previously associated with the virtual GPR 150 to the now-allocated physical GPR 138. As such, any subsequent accesses to the GPR will occur to the physical GPR 138, and thus be performed more quickly compared to access to a virtual GPR.

Returning to block 504, in the event that the thread suspend mode is selected or pre-configured, the oversubscribed handler 146 enters the thread suspend mode. In this mode, rather than instantiate a virtual GPR in response to a GPR allocation request, at block 512 the oversubscribed handler 146 instead signals the ALU 134 of the requesting thread to temporarily suspend execution of the requesting thread as there are no physical GPRs 138 remaining to allocate to the thread, and thus the thread cannot properly continue execution. As physical GPRs 138 may be deallocated by other threads while the requesting thread is suspended, at block 514 the GPR monitor 144 monitors the free list 148 to identify whether a physical GPR has now become available for allocation. When such a physical GPR 138 is so identified, at block 516 the GPR allocator 142 allocates the physical GPR 138 to the requesting thread and the oversubscribed handler 146 signals the ALU 134 to terminate suspension of the thread.

At block 518, the GPR monitor 144 determines whether there are any other threads at the compute unit 122 that remain suspended. If so, the method 300 returns to block 514 with the GPR monitor 144 monitoring for other physical GPRs 138 to become available for allocation to suspended threads. Otherwise, if no other threads remain suspended (that is, all threads do not have a pending GPR allocation request while no physical GPRs 138 are available), then at block 520 the GPR monitor 144 signals the GPR resource manager 140 to exit the oversubscribed state and to return to the previous mode of GPR allocation.

In some embodiments, the apparatus and techniques described above are implemented in a system comprising one or more integrated circuit (IC) devices (also referred to as integrated circuit packages or microchips), such as the GPU 104 described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for allocating registers in a compute unit of a vector processor, the method comprising:
   determining a maximum number of registers that are to be used concurrently by a plurality of threads of a kernel at the compute unit, wherein determining the maximum number of registers comprises determining the maximum number of registers from metadata in a data structure representing the kernel, the metadata including a value representative of the maximum number of registers; and
   setting a mode of register allocation at the compute unit based on a comparison of the determined maximum number of registers and a total number of physical registers implemented at the compute unit.

2. The method of claim 1, wherein setting the mode of register allocation comprises:
   determining a minimum number of registers needed to initiate execution of the plurality of threads; and
   responsive to the determined maximum number of registers being greater than the total number of physical registers and responsive to the total number of physical registers being greater than or equal to the minimum number of registers, setting the mode of register allocation to a thread initialization mode whereby each thread of the plurality of threads is initially assigned a corresponding number of physical registers sufficient to initiate execution of the thread at the compute unit.

3. The method of claim 2, wherein setting the mode of register allocation further comprises:
   responsive to the total number of physical registers being greater than or equal to the determined maximum number of registers and less than a total number of registers used during execution of the plurality of threads at the compute unit, setting the mode of register allocation to a recapture allocation mode in which each thread is dynamically allocated physical registers from the physical registers implemented at the compute unit and in which each dynamically-allocated physical register is dynamically deallocated after completion of a corresponding instruction of the thread.

4. The method of claim 1, wherein setting the mode of register allocation further comprises:
   responsive to the total number of physical registers being greater than or equal to the determined maximum number of registers and less than a total number of registers used during execution of the plurality of threads at the compute unit, setting the mode of register allocation to a recapture allocation mode in which each thread is dynamically allocated physical registers from the physical registers implemented at the compute unit and in which each dynamically-allocated physical register is dynamically deallocated after completion of a corresponding instruction of the thread.

5. The method of claim 1, further comprising:
   monitoring, at the compute unit, allocation of the physical registers implemented at the compute unit to threads of the kernel; and
   responsive to determining an oversubscription condition in which every physical register of the compute unit is allocated, setting the compute unit to an oversubscription mode in which requests for allocation of a register from a thread results in allocation of a virtual register to the thread.

6. The method of claim 5, further comprising:
   responsive to determining that a physical register has become available for allocation after allocation of the virtual register, transferring data stored in the virtual register to the physical register that has become available.

7. The method of claim 1, further comprising:
   monitoring, at the compute unit, allocation of the physical registers implemented at the compute unit to threads of the kernel; and
   responsive to determining an oversubscription condition in which every physical register of the compute unit is allocated, setting the compute unit to an oversubscription mode in which a thread with an unallocated register is suspended until a physical register of the compute unit is made available for allocation.

8. A vector processor comprising:
   a set of one or more compute units, each compute unit comprising:
      a set of physical registers;
      a set of arithmetic logical units (ALUs); and
      a register resource manager to determine a maximum number of registers that are to be used concurrently by a plurality of threads of a kernel at the compute unit and to set a mode of register allocation at the compute unit based on a comparison of the determined maximum number of registers and a total number of physical registers implemented at the compute unit, wherein the register resource manager is configured to determine the maximum number of registers from metadata in a data structure representing the kernel, the metadata including a value representative of the maximum number of registers.

9. The vector processor of claim 8, wherein the register resource manager is to set the mode of register allocation by:
   determining a minimum number of registers needed to initiate execution of the plurality of threads; and
   responsive to the determined maximum number of registers being greater than the total number of physical registers and responsive to the total number of physical registers being greater than or equal to the minimum number of registers, setting the mode of register allocation to a thread initialization mode whereby each thread of the plurality of threads is initially assigned a corresponding number of physical registers sufficient to initiate execution of the thread at the compute unit.

10. The vector processor of claim 9, wherein the register resource manager is to set the mode of register allocation further by:
    responsive to the total number of physical registers being greater than or equal to the determined maximum number of registers and less than a total number of registers used during execution of the plurality of threads at the compute unit, setting the mode of register allocation to a recapture allocation mode in which each thread is dynamically allocated physical registers from the physical registers implemented at the compute unit and in which each dynamically-allocated physical register is dynamically deallocated after completion of a corresponding instruction of the thread.

11. The vector processor of claim 8, wherein the register resource manager is to set the mode of register allocation by:
  responsive to the total number of physical registers being greater than or equal to the determined maximum number of registers and less than a total number of registers used during execution of the plurality of threads at the compute unit, setting the mode of register allocation to a recapture allocation mode in which each thread is dynamically allocated physical registers from the physical registers implemented at the compute unit and in which each dynamically-allocated physical register is dynamically deallocated after completion of a corresponding instruction of the thread.

12. The vector processor of claim 8, wherein the register resource manager includes:
  a register monitor to monitor allocation of the physical registers implemented at the compute unit to threads of the kernel; and
  an oversubscription handler to, responsive to determining an oversubscription condition in which every physical register of the set is allocated, set the compute unit to an oversubscription mode in which requests for allocation of a register from a thread results in allocation of a virtual register to the thread.

13. The vector processor of claim 12, wherein the oversubscription handler further is to, responsive to determining that a physical register has become available for allocation after allocation of the virtual register, transfer a data stored in the virtual register to the physical register that has become available.

14. The vector processor of claim 8, wherein the register resource manager includes:
  a register monitor to monitor allocation of the physical registers implemented at the compute unit to threads of the kernel; and
  an oversubscription handler to, responsive to determining an oversubscription condition in which every physical register of the set is allocated, set the compute unit to an oversubscription mode in which a thread with an unallocated register is suspended until a physical register of the set is made available for allocation.

15. The vector processor of claim 8, further comprising:
  a free list data structure accessible by the register resource manager, the free list data structure storing data indicating an allocation status of each physical register of the set of physical registers.

16. The vector processor of claim 8, wherein the vector processor comprises a graphics processing unit (GPU).

* * * * *